US012664037B2

(12) United States Patent 
Kong

(10) Patent No.: US 12,664,037 B2 
(45) Date of Patent: Jun. 23, 2026

(54) METHOD AND SYSTEM FOR UPGRADING CPE FIRMWARE

(71) Applicant: SUZHOU METABRAIN INTELLIGENT TECHNOLOGY CO., LTD., Suzhou (CN)

(72) Inventor: Tao Kong, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 204 days.

(21) Appl. No.: 18/564,696

(22) PCT Filed: Mar. 29, 2022

(86) PCT No.: PCT/CN2022/083577
§ 371 (c)(1),
(2) Date: Nov. 28, 2023

(87) PCT Pub. No.: WO2023/071039
PCT Pub. Date: May 4, 2023

(65) Prior Publication Data
US 2024/0272975 A1 Aug. 15, 2024

(30) Foreign Application Priority Data
Oct. 26, 2021 (CN) .......................... 202111244269.0

(51) Int. Cl.
G06F 11/00 (2006.01)
G06F 11/07 (2006.01)
G06F 11/34 (2006.01)

(52) U.S. Cl.
CPC ...... G06F 11/0766 (2013.01); G06F 11/0727 (2013.01); G06F 11/3476 (2013.01)

(58) Field of Classification Search
CPC .................................................. G06F 11/0766
See application file for complete search history.

(56) References Cited

U.S. PATENT DOCUMENTS 6,553,509 B1 4/2003 Hanson et al.
8,321,650 B2 * 11/2012 Steinmetz ........... H04L 67/1097
711/E12.001
(Continued)

FOREIGN PATENT DOCUMENTS

CN 109614469 A 4/2019
CN 111061584 A 4/2020
(Continued)

OTHER PUBLICATIONS

Chinese Search Report received for CN Application No. 2021112442690 on Nov. 24, 2021, 2 pgs.
(Continued)

*Primary Examiner* — Loan L.T. Truong
(74) *Attorney, Agent, or Firm* — Merchant & Gould P.C.

(57) ABSTRACT

Disclosed are a fault diagnosis method, device and apparatus, and a readable storage medium in the disclosure. The method includes: obtaining log files of an RAID card in a server to be monitored; determining whether the RAID card and a hard disk managed by the RAID card have a fault according to a fault diagnosis rule base and the log files of the RAID card, and providing a fault processing solution by using the fault diagnosis rule base when a fault is determined to exist, where the fault diagnosis rule base is established by analyzing historical faults of the RAID card and the hard disk managed by the RAID card in advance; and outputting a log file that determines that the RAID card and/or the hard disk managed by the RAID card has a fault, and the fault processing solution.

10 Claims, 2 Drawing Sheets

(56) References Cited

U.S. PATENT DOCUMENTS

| | | | | |
|---|---|---|---|---|
| 10,606,490 | B2 * | 3/2020 | Nimura | G06F 3/0619 |
| 10,824,497 | B2 * | 11/2020 | Wang | G06F 11/0751 |
| 10,860,451 | B1 * | 12/2020 | Murthy | G06F 17/40 |
| 11,151,008 | B2 * | 10/2021 | Mercer | G06F 11/3089 |
| 11,157,343 | B2 * | 10/2021 | Braundmeier | G06F 11/3476 |
| 11,423,202 | B2 * | 8/2022 | Mrugalski | G01R 31/318357 |
| 11,487,996 | B2 * | 11/2022 | Chowdhury | G06N 3/045 |
| 11,513,930 | B2 * | 11/2022 | Chan | G06F 11/3476 |
| 11,669,081 | B2 * | 6/2023 | Dix | G05B 23/0272 |
| | | | | 700/80 |
| 2004/0123188 | A1 * | 6/2004 | Srinivasan | G06F 11/2294 |
| | | | | 714/E11.173 |
| 2018/0357108 | A1 * | 12/2018 | Mullender | G06F 9/5077 |
| 2019/0180791 | A1 * | 6/2019 | Lin | G06F 15/161 |
| 2019/0286628 | A1 * | 9/2019 | Zhou | G06F 11/0709 |
| 2019/0347154 | A1 * | 11/2019 | Mattia | G06F 11/0769 |
| 2020/0364175 | A1 * | 11/2020 | Qiao | G06F 3/0664 |
| 2021/0064500 | A1 * | 3/2021 | Przestrzelski | G06F 11/079 |
| 2021/0160307 | A1 * | 5/2021 | Brown | G06F 11/3075 |
| 2023/0062741 | A1 * | 3/2023 | Satterfield | H04L 45/74 |

FOREIGN PATENT DOCUMENTS

| | | |
|---|---|---|
| CN | 111242225 A | 6/2020 |
| CN | 111949488 A | 11/2020 |
| CN | 113409876 A | 9/2021 |
| CN | 113689911 A | 11/2021 |

OTHER PUBLICATIONS

International Search Report & Written Opinion for PCT International Serial No. PCT /CN2022/083577, Jun. 29, 2022, 5 pages.

* cited by examiner

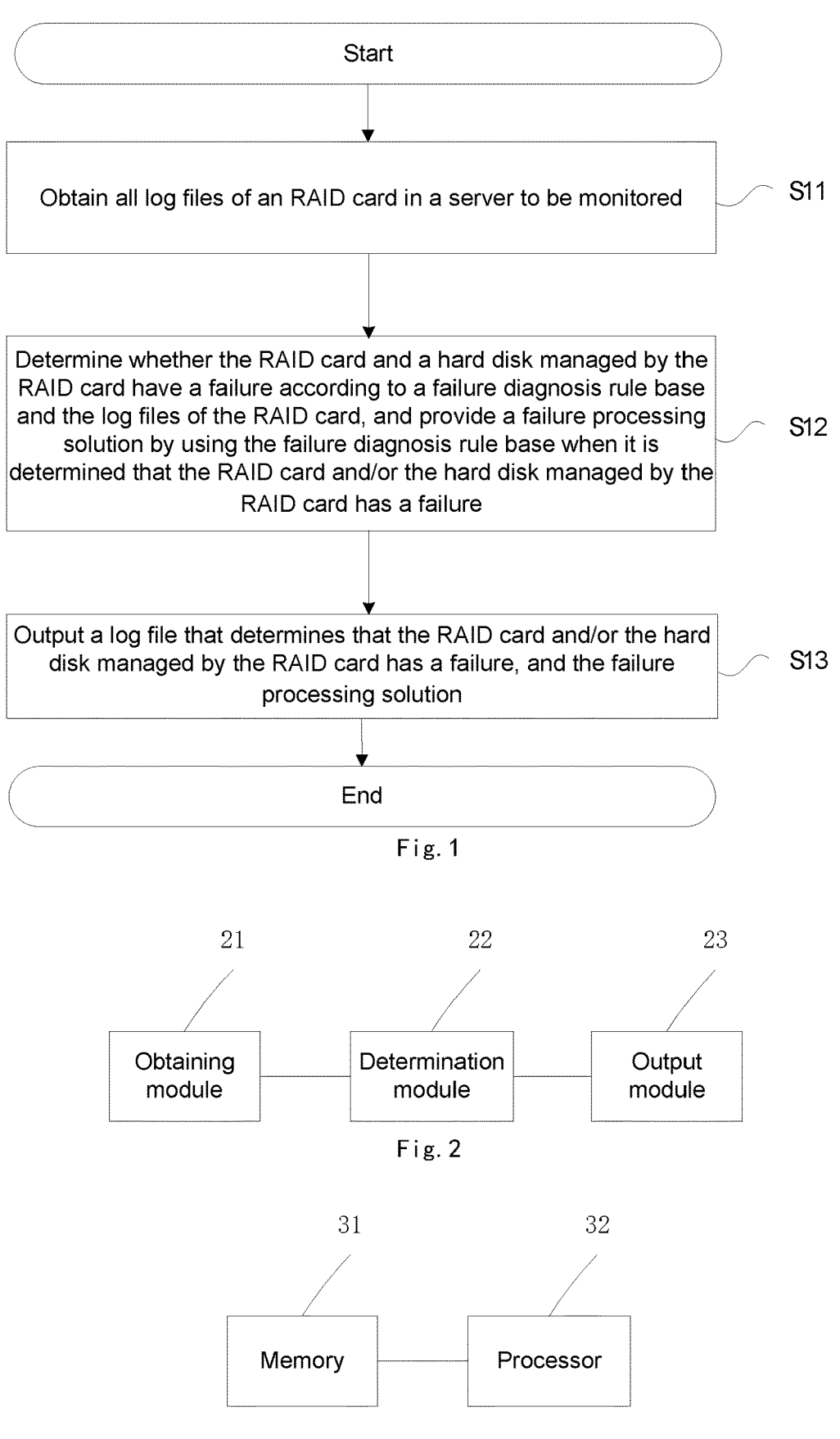

Start

Obtain all log files of an RAID card in a server to be monitored          S11

Determine whether the RAID card and a hard disk managed by the RAID card have a failure according to a failure diagnosis rule base and the log files of the RAID card, and provide a failure processing solution by using the failure diagnosis rule base when it is determined that the RAID card and/or the hard disk managed by the RAID card has a failure          S12

Output a log file that determines that the RAID card and/or the hard disk managed by the RAID card has a failure, and the failure processing solution          S13

End

Obtaining module   —   Determination module   —   Output module

Memory   —   Processor

Fig. 3

METHOD AND SYSTEM FOR UPGRADING CPE FIRMWARE

CROSS-REFERENCE TO RELATED APPLICATION

The present application is a National Stage Application of PCT International Application No. PCT/CN2022/083577 filed on Mar. 29, 2022, which claims priority to Chinese Patent Application No. 202111244269.0, filed to the China National Intellectual Property Administration on Oct. 26, 2021, the disclosure of which is hereby incorporated by reference in its entirety.

TECHNICAL FIELD

The disclosure relates to the technical field of servers, and particularly relates to a Fault diagnosis method, apparatus and device, and a readable storage medium.

BACKGROUND

As the types of redundant arrays of independent disks (RAID) and hard disks keep increasing, management modes adopted by the RAID for the hard disk increase. In an RAID management mode, a server cannot directly sense whether a state of a hard disk is normal, and faults of the RAID or hard disk will lead to data loss, crash and other problems of a server.

In summary, how to diagnose the faults of the RAID and hard disk so as to facilitate timely treatment of the faults and reduce a probability of data loss and crash of a server is a technical problem that needs to be solved by those skilled in the art at present.

SUMMARY

In view of that, an objective of the disclosure is to provide a fault diagnosis method, apparatus and device, and a readable storage medium, to diagnose faults of redundant array of independent disks (RAID) and hard disks, so as to facilitate timely treatment of the faults and reduce a probability of data loss and crash of a server.

In order to achieve the above objective, the disclosure provides the following technical solutions.

A fault diagnosis method includes:obtaining log files of an RAID card in a server to be monitored; determining whether the RAID card and a hard disk managed by the RAID card have a fault according to a fault diagnosis rule base and the log files of the RAID card, and providing a fault processing solution by using the fault diagnosis rule base when it is determined that the RAID card and/or the hard disk managed by the RAID card has a fault, where the fault diagnosis rule base is established by analyzing historical faults of the RAID card and the hard disk managed by the RAID card in advance; and outputting a log file that determines that the RAID card and/or the hard disk managed by the RAID card has a fault, and the fault processing solution.

In an embodiment, the determining whether the RAID card and a hard disk managed by the RAID card have a fault according to a fault diagnosis rule base and the log files of the RAID card, and providing a fault processing solution by using the fault diagnosis rule base when it is determined that the RAID card and/or the hard disk managed by the RAID card has a fault include: comparing each log file of the RAID card with the fault diagnosis rule base, and determining whether an object file matching a current log file of the RAID card exists in the fault diagnosis rule base; matching each diagnosis keyword corresponding to the object file with each line of content in the current log file under the condition that the object file exists;

determining that the RAID card and/or the hard disk managed by the RAID card has a fault under the condition that at least one line of content matching each diagnosis keyword exists in the current log file; and determining whether a fault diagnosis method corresponding to the object file exists in the fault diagnosis rule base, and diagnosing the current log file through the fault diagnosis method under the condition that the fault diagnosis method corresponding to the object file exists, to provide the fault processing solution.

In an embodiment, the diagnosing the current log file through the fault diagnosis method, to provide the fault processing solution includes: extracting a first slot number from the current log file according to a first preset regular expression; searching for latest information corresponding to the first slot number from the current log file; providing the fault processing solution that is to replace a hard disk on the first slot number under the condition that the latest information includes abnormal information; filtering the latest information from the current log file under the condition that the latest information includes normal information; and providing the fault processing solution that is to provide a hard disk fault on the first slot number, suggest submitting a work order and escalate a corresponding fault problem to tier two under the condition that the latest information does not include the abnormal information and the normal information.

In an embodiment, the diagnosing the current log file through the fault diagnosis method, to provide the fault processing solution includes: extracting a second slot number from the current log file according to a second preset regular expression, and extracting an error count corresponding to the second slot number from the current log file according to a third preset regular expression; providing the fault processing solution that is to replace the RAID card, a backplane and a serial-attached small computer system interface (SAS) cable one by one in sequence under the condition that the error count is greater than 1; and providing the fault processing solution that is to replace a hard disk on the second slot number under the condition that the error count is equal to 1.

In an embodiment, the diagnosing the current log file through the fault diagnosis method, to provide the fault processing solution includes: extracting a last keyword corresponding to the object file from the fault diagnosis rule base, and extracting a numerical value corresponding to the last keyword from the current log file; filtering the content of a line where the numerical value is located from the current log file under the condition that the numerical value is equal to 0; extracting a serial number from the current log file under the condition that the numerical value is great than 0, circularly traversing the current log file according to a fourth preset regular expression, searching, under the condition that a line of content matching the fourth preset regular expression exists in the current log file, forwards from a line of content matching the fourth preset regular expression for a content matching a fifth preset regular expression, and extracting a third slot number from the content matching the fifth preset regular expression; providing the fault processing solution that is to replace the hard disk corresponding to the third slot number and the serial number under the condition that the diagnosis keyword in the fault diagnosis rule base includes any one of hwErrors, mediumErrors, and smartWarning; obtaining the number of numerical values greater than 0 and corresponding to the last keyword under the condition that the diagnosis keyword in the fault diagnosis rule base does not include any one of hw Errors, medium Errors, and smart Warning; providing the fault processing solution that is to replace the hard disk corresponding to the third slot number and the serial number under the condition that the number is equal to 1; and providing the fault processing solution that is to take a link problem into account, and suggest replacing the RAID card, a backplane and an SAS cable one by one in sequence under the condition that the number is greater than 1.

In an embodiment, the fault diagnosis method further includes: extracting state information from the current log file under the condition that no object file matching the current log file of the RAID card exists in the fault diagnosis rule base, or under the condition that an object file matching the current log file of the RAID card exists in the fault diagnosis rule base and no at least one line of content matching each diagnosis keyword in the current log file; constructing a log training set according to the state information, selecting a sample from the log training set by means of a Relief filter selection algorithm, searching for a near-hit sample from samples of the same class as the sample, randomly selecting a near-miss sample from samples of different classes from the sample, increasing, under the condition that a distance between the sample and the near-hit sample in a feature is less than a distance between the sample and the near-miss sample in the same feature, a weight of the feature, reducing, under the condition that the distance between the sample and the near-hit sample in the feature is not less than the distance between the sample and the near-miss sample in the same feature, the weight of the feature, performing training on the feature preset times, and obtaining an average weight of the feature after the preset times of training; adding a feature with an average weight greater than a preset value into a feature set, and outputting the feature set; and receiving an analysis result of the feature set, and adding the analysis result of the feature set to the fault diagnosis rule base.

In an embodiment, the outputting a log file that determines that the RAID card and/or the hard disk managed by the RAID card has a fault, and the fault processing solution includes: outputting the log file that determines that the RAID card and/or the hard disk managed by the RAID card has a fault, and the fault processing solution to a mobile terminal by means of an email and/or a short message.

A fault diagnosis device includes: an obtaining module, configured to obtain log files of an RAID card in a server to be monitored; a determination module, configured to determine whether the RAID card and a hard disk managed by the RAID card have a fault according to a fault diagnosis rule base and the log files of the RAID card, and provide a fault processing solution by using the fault diagnosis rule base when it is determined that the RAID card and/or the hard disk managed by the RAID card has a fault, where the fault diagnosis rule base is established by analyzing historical faults of the RAID card and the hard disk managed by the RAID card in advance; and an output module, configured to output a log file that determines that the RAID card and/or the hard disk managed by the RAID card has a fault, and the fault processing solution.

A fault diagnosis apparatus includes: a memory, configured to store a computer program; and a processor, configured to implement steps of the fault diagnosis method according to any one above items when executing the computer program.

A readable storage medium stores a computer program, where the computer program implements steps of the fault diagnosis method according to any one of above items when executed by a processor.

The disclosure provides a fault diagnosis method, device and apparatus, and a readable storage medium. The method includes: obtaining log files of an RAID card in a server to be monitored; determining whether the RAID card and a hard disk managed by the RAID card have a fault according to a fault diagnosis rule base and the log files of the RAID card, and providing a fault processing solution by using the fault diagnosis rule base when it is determined that the RAID card and/or the hard disk managed by the RAID card has a fault, where the fault diagnosis rule base is established by analyzing historical faults of the RAID card and the hard disk managed by the RAID card in advance; and outputting a log file that determines that the RAID card and/or the hard disk managed by the RAID card has a fault, and the fault processing solution.

According to the above technical solution disclosed in the disclosure, it is determined whether the RAID card in the server to be monitored and/or the hard disk managed by the RAID card has a fault according to the fault diagnosis rule base established by analyzing the historical faults of the RAID card and the hard disk managed by the RAID card in advance and the obtained log files of the RAID card in the server to be monitored, and the fault processing solution is provided by using the fault diagnosis rule base when it is determined that the fault exists, such that fault diagnosis is performed on the RAID card and the hard disk. By outputting the log file that determines that the RAID card and/or the hard disk managed by the RAID card has a fault, and the fault processing solution, relevant personnel can conveniently know the fault in time and process the fault in conjunction with the fault processing solution, such that the failed RAID card and/or hard disk managed by the RAID card can recover to normal in time, a probability of data loss and crash of the server is reduced, and running stability and reliability of the server are improved.

BRIEF DESCRIPTION OF THE DRAWINGS

In order to more clearly illustrate technical solutions in the examples of the disclosure or in the prior art, a brief introduction to the accompanying drawings required for the description of the examples or the prior art will be provided below. Apparently, the accompanying drawings in the following description are merely the examples of the disclosure, and those of ordinary skill in the art would also be able to derive other drawings from these provided drawings without making creative efforts.

FIG. 1 is a flowchart of a fault diagnosis method according to an example of the disclosure;

FIG. 2 is a schematic structural diagram of a fault diagnosis device according to an example of the disclosure; and FIG. 3 is a schematic structural diagram of a fault diagnosis apparatus according to an example of the disclosure.

DETAILED DESCRIPTION OF THE EMBODIMENTS

Figure 4:
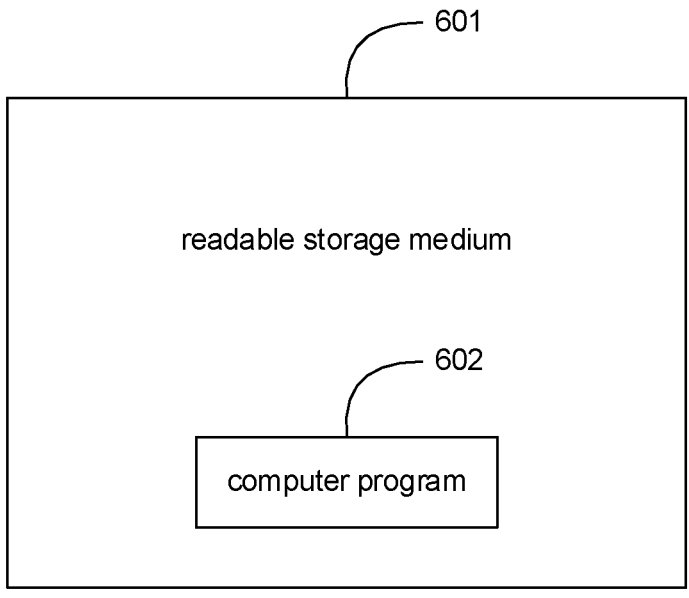
FIG. 4 is a schematic structural diagram of a readable storage medium according to an example of the disclosure.

A core of the disclosure is to provide a fault diagnosis method, device and apparatus, and a readable storage medium, to diagnose faults of redundant array of independent disks (RAID) and hard disks, so as to facilitate timely treatment of the faults and reduce a probability of data loss and crash of a server.

The technical solutions of examples of the disclosure will be described below clearly and comprehensively in conjunction with accompanying drawings of the examples of the disclosure. Apparently, the examples described are merely some examples rather than all examples of the disclosure. Based on the examples of the disclosure, all other examples obtained by those of ordinary skill in the art without making creative efforts fall within the scope of protection of the disclosure.

FIG. 1 is a flowchart of a fault diagnosis method according to an example of the disclosure. The fault diagnosis method provided according to an example of the disclosure may include:

S11: obtain log files of an RAID card in a server to be monitored.

In the disclosure, a monitoring platform may remotely monitor the server to be monitored by means of a secure shell (SSH) protocol, and obtain log files of the RAID card in the server to be monitored. The log files mentioned herein include, but are not limited to, storcliAdpalilog.txt (hard disk state information file in txt format), storcliPDList.txt (logical disk list information file in txt format), Controller_1_Config.txt (controller configuration information file in txt format), and Controller_1_Device_log.txt (controller device log information in txt format).

In order to improve legality and efficiency of obtaining log files, information about a server needing to be monitored (that is, the server to be monitored) may be registered to the monitoring platform in advance. The information mentioned herein about the server may in an embodiment include an IP, a user name, and a password of the server. After the server to be monitored is successfully registered, the monitoring platform may log in the server to be monitored according to registration information of the server to be monitored, copy a tool (such as storcli64 tool) for capturing the log file of the RAID card to a specified directory of the server to be monitored remotely, give the tool executable permission, to use the tool to collect the log files of the RAID card in the server to be monitored, and return the collected log files of the RAID card to the monitoring platform, such that the monitoring platform obtains the log files of the RAID card in the server to be monitored.

S12: determine whether the RAID card and a hard disk managed by the RAID card have a fault according to a fault diagnosis rule base and the log files of the RAID card, and provide a fault processing solution by using the fault diagnosis rule base when it is determined that the RAID card and/or the hard disk managed by the RAID card has a fault, where the fault diagnosis rule base is established by analyzing historical faults of the RAID card and the hard disk managed by the RAID card in advance.

After the log files of the RAID card in the server to be monitored are obtained, it may be determined whether the RAID card and the hard disk managed by the RAID card have a fault according to the fault diagnosis rule base established in advance and the log files of the RAID card, and the fault processing solution may be provided by using the fault diagnosis rule base when it is determined that the RAID card and/or the hard disk managed by the RAID card have a fault according to the fault diagnosis rule base established in advance.

The fault diagnosis rule base is established by pre-collecting historical faults of RAID cards and hard disks managed by the RAID cards in servers monitored by the monitoring platform, and analyzing and extracting the historical faults of the RAID cards and the hard disks managed by the RAID cards.

It can be seen from the above process that the disclosure may remotely monitor the server to be monitored, obtain the log files of the RAID card of the server to be monitored, and perform fault diagnosis on the RAID card in the server to be monitored and the hard disk managed by the RAID card by means of the fault diagnosis rule base established in advance and the obtained log files of the RAID card, so as to find faults in time and provide a fault processing solution.

S13: output a log file that determines the RAID card and/or the hard disk managed by the RAID card has a fault, and the fault processing solution.

Based on S12, the log file that determines the RAID card and/or the hard disk managed by the RAID card has a fault, that is, the log file containing fault information may be output, and a fault processing solution may be also output, such that relevant personnel may know the fault information of the RAID card and/or the hard disk managed by the RAID card by means of the output log file, and process the fault according to the fault processing solution. Therefore, a faulty component may recover to normal in time, that is, the RAID card and the hard disk managed by the RAID card may operate normally in the server to be monitored, such that a probability of data loss and crash of the server is reduced, stability and reliability of operation of the server are improved. Moreover, the disclosure has desirable universality, and could perform fault diagnosis on RAID cards of different manufacturers and hard disks under different RAID management modes, so as to effectively reduce the risk of data loss and the crash probability of the server caused by hard disk fault.

According to the above technical solution disclosed in the disclosure, it is determined whether the RAID card in the server to be monitored and/or the hard disk managed by the RAID card has a fault according to the fault diagnosis rule base established by analyzing the historical faults of the RAID card and the hard disk managed by the RAID card in advance and the obtained log files of the RAID card in the server to be monitored, and the fault processing solution is provided by using the fault diagnosis rule base when it is determined that the fault exists, such that fault diagnosis is performed on the RAID card and the hard disk. By outputting the log file that determines the RAID card and/or the hard disk managed by the RAID card has a fault, and the fault processing solution, relevant personnel can conveniently know the fault in time and process the fault in conjunction with the fault processing solution, such that the failed RAID card and/or hard disk managed by the RAID card can recover to normal in time, the probability of data loss and crash of the server is reduced, and running stability and reliability of the server are improved.

According to the fault diagnosis method in the example of the disclosure, the step of determining whether the RAID card and a hard disk managed by the RAID card have a fault according to a fault diagnosis rule base and the log files of the RAID card, and providing a fault processing solution by using the fault diagnosis rule base when it is determined that the RAID card and/or the hard disk managed by the RAID card has a fault may include:

compare each log file of the RAID card with the fault diagnosis rule base, and determine whether an object file matching a current log file of the RAID card exists in the fault diagnosis rule base;

match each diagnosis keyword corresponding to the object file with each line of content in the current log file under the condition that the object file exists;

determine that the RAID card and/or the hard disk managed by the RAID card has a fault under the condition that at least one line of content matching each diagnosis keyword exists in the current log file; and determine whether a fault diagnosis method corresponding to the object file exists in the fault diagnosis rule base, and diagnose the current log file through the fault diagnosis method under the condition that the fault diagnosis method corresponding to the object file exists, to provide the fault processing solution.

In the disclosure, the fault diagnosis rule base established in advance includes pieces of rule information, where each piece of rule information has the following format:

file (specifies a file name): the monitoring platform matches a log file to be diagnosed according to the file name of the file;

diagnosis keyword: an error content reported in the log file after the RAID card or hard disk has a fault; and Fault diagnosis method: the method is used to provide a fault processing solution, where some pieces of rule information may have an item of fault diagnosis method, and some pieces of rule information may have no item of fault diagnosis method.

When it is determined whether the RAID card and a hard disk managed by the RAID card have a fault according to a fault diagnosis rule base and the log files of the RAID card, and a fault processing solution is provided by using the fault diagnosis rule base when it is determined that the RAID card and/or the hard disk managed by the RAID card has a fault, the monitoring platform may compare and match the log files of the RAID card with the rule information in the fault diagnosis rule base. In an embodiment, each log file of the RAID card may be sequentially used as a current log file to be compared and match with the fault diagnosis rule base, such that whether an object file matching the current log file of the RAID card exists in the fault diagnosis rule base is determined. In an embodiment, whether a file with a file name matching the current log file of the RAID card exists in the fault diagnosis rule base is determined according to the rule information contained in the fault diagnosis rule base. Under the condition that a file with a file name matching the current log file of the RAID card exists in the fault diagnosis rule base, it is considered that an object file matching the current log file of the RAID card exists in the fault diagnosis rule base. For example, under the condition that a storcliAdpalilog.txt file is applicable to a file named "storcliAdpalilog" in the rule base, the file named "storcli-Adpalilog" may be determined as an object file matching the current log file of the RAID card. Under the condition that no file with a file name matching the current log file of the RAID card exists in the fault diagnosis rule base, it is determined that no object file matching the current log file of the RAID card exists in the fault diagnosis rule base, and it is considered that the current log file contains no fault information. In this case, the step of determining whether the object file matching the current log file of the RAID card exists in the fault diagnosis rule base is returned by taking a next log file of the RAID as the current log file, until processing of all the obtained log files is completed.

When it is determined that an object file matching the current log file of the RAID card exists in the fault diagnosis base, the monitoring platform matches each diagnosis keyword corresponding to the object file with each line of content in the current log file. Before matching, the diagnosis keywords corresponding to the object file may be first separated by ",". That is, two adjacent diagnosis keywords are distinguished by commas. Then the current log file is circularly traversed and matched line by line by using the separated diagnosis keywords, such that it is determined whether lines of contents in the current log file match the diagnosis keywords corresponding to the object file.

Under the condition that at least one line of content matching the diagnosis keyword corresponding to the object file exists in the current log file, each line of content matching each diagnosis keyword corresponding to the object file is recorded as a fault line, and it is determined that the RAID card and/or the hard disk managed by the RAID card has a fault. That is to say, under the condition that at least one line of content matching the diagnosis keyword corresponding to the object file exists in the current log file, it is considered that fault information exists in the current log file. Under the condition that no line of content in the current log file matches the diagnosis keyword corresponding to the object file, it is determined that the current log file has no fault information. In this case, the step of determining whether the object file matching the current log file of the RAID card exists in the fault diagnosis rule base is returned by taking a next log file of the RAID as the current log file, until processing of all the obtained log files is completed.

After it is determined that the RAID card and/or the hard disk managed by the RAID card has a fault, it is determined whether a fault diagnosis method corresponding to the object file exists in the fault diagnosis rule base, and the current log file is diagnosed through the fault diagnosis method under the condition that the fault diagnosis method corresponding to the object file exists, such that the fault processing solution is provided. Under the condition that no fault diagnosis method corresponding to the object file exists, a prompt of no fault processing solution may be provided.

By means of the above process, whether the RAID card and the hard disk managed by the RAID card have a fault can be accurately determined, and a corresponding fault processing solution can be given, such that relevant personnel can accurately process the fault according to the fault processing solution.

The example of the disclosure provides a fault diagnosis method. The step of diagnosing the current log file through the fault diagnosis method, to provide the fault processing solution may include:

extract a first slot number from the current log file according to a first preset regular expression;

search for latest information corresponding to the first slot number from the current log file;

provide the fault processing solution that is to replace a hard disk on the first slot number under the condition that the latest information includes abnormal information; filter the latest information from the current log file under the condition that the latest information includes normal information; and provide the fault processing solution that is to provide a hard disk fault on the first slot number, suggest submitting a work order and escalate a corresponding fault problem to tier two under the condition that the latest information does not include the abnormal information and the normal information.

In the disclosure, when a fault diagnosis method is used to diagnose a current log file, to provide a fault processing solution, whether the current log file satisfies a first preset regular expression may be checked, and if the current log file satisfies the first preset regular expression, a first slot number may be extracted from the current log file according to the first preset regular expression. For example, the first slot number may be checked and extracted according to a regular expression ^.*PD.*\\(.*\Vs[0-9]{1,}\\).*$ (that is, it can be used as the first preset regular expression), and is recorded as slot1. The foregoing steps may be regarded as hard disk slot analysis, and the following steps may be regarded as fault information filtering:

after the first slot number slot1 is extracted, search for a latest piece of information satisfying the first preset regular expression from the current log file according to the first slot number slot1, that is, search for the latest information corresponding to the first slot number;

provide a fault processing solution that is to replace a hard disk on the first slot number under the condition that the latest found information includes abnormal information of "to FAILED" or "to UNCONFIGURED_BAD";

filter the latest information from the current log file, that is, filter the fault information under the condition that the latest found information includes normal information of "to ONLINE", etc.; and provide the fault processing solution that is to provide a hard disk fault on the first slot number, suggest submitting a work order and escalate a fault problem to tier two under the condition that the latest found information includes neither abnormal information nor normal information, so as to submit the fault problem to tier two operation and maintenance personnel through the work order, such that the tier two operation and maintenance personnel can handle the hard disk on the first slot number according to the work order.

The fault diagnosis method in the disclosure may be regarded as hard disk slot analysis and fault information filtering. Through the above method, not only can the fault be diagnosed, but also an accurate fault processing solution can be given, such that relevant personnel can perform fault maintenance according to the output fault processing solution.

The example of the disclosure provides a fault diagnosis method. The step of diagnosing the current log file through the fault diagnosis method, to provide the fault processing solution may include:

extract a second slot number from the current log file according to a second preset regular expression, and extract an error count corresponding to the second slot number from the current log file according to a third preset regular expression;

provide the fault processing solution that is to replace the RAID card, a backplane and a serial-attached small computer system interface (SAS) cable one by one in sequence under the condition that the error count is greater than 1; and provide the fault processing solution that is to replace a hard disk on the second slot number under the condition that the error count is equal to 1.

In the disclosure, when the current log file is diagnosed through the fault diagnosis method, to provide the fault processing solution, besides the above manner, the following manner may also be used for implementation.

The current log file is traversed line by line, a second slot number is extracted from the current log file according to a second preset regular expression, and an error count corresponding to the second slot number is extracted from the current log file according to a third preset regular expression. The error count corresponding to the second slot number represents the number of faults of the hard disk corresponding to the second slot number. The second preset regular expression may in an embodiment be Slot Number:[0-9]{1,}, the third regular expression may in an embodiment be Other Error Count: [0-9]{1,}, the extracted second slot number may be represented as slot2, and the corresponding error count of the second slot number may be represented as M.

Under the condition that the error count M corresponding to the second slot number slot2 is greater than 1, it is unlikely that a plurality of hard disks have faults simultaneously, and a most likely fault situation is that the RAID card managing the hard disks has a fault or a link or a hard disk backplane has a fault. In this case, a fault processing solution that is to suggest replacing the RAID card, the backplane and the SAS cable one by one in sequence may be provided.

Under the condition that the error count M corresponding to the second slot number slot2 is equal to 1, it is likely that the hard disk has a fault. In this case, the fault processing solution that is to replace a hard disk on the second slot number may be provided.

The above fault diagnosis method can be regarded as link problem detection.

The example of the disclosure provides a fault diagnosis method. The step of diagnosing the current log file through the fault diagnosis method, to provide the fault processing solution may include:

extract a last keyword corresponding to the object file from the fault diagnosis rule base, and extract a numerical value corresponding to the last keyword from the current log file;

filter a content of a line where the numerical value is located from the current log file under the condition that the numerical value is equal to 0;

extract a serial number from the current log file under the condition that the numerical value is great than 0, circularly traverse the current log file according to a fourth preset regular expression, search, under the condition that a line of content matching the fourth preset regular expression exists in the current log file, forwards from a line of content matching the fourth preset regular expression for a content matching a fifth preset regular expression, and extract a third slot number from the content matching the fifth preset regular expression;

provide the fault processing solution that is to replace the hard disk corresponding to the third slot number and the serial number under the condition that the diagnosis keyword in the fault diagnosis rule base includes any one of hwErrors, mediumErrors, and smartWarning;

obtain the number of numerical values greater than 0 and corresponding to the last keyword under the condition that the diagnosis keyword in the fault diagnosis rule base does not include any one of hwErrors, mediumErrors, and smartWarning;

provide the fault processing solution that is to replace the hard disk corresponding to the third slot number and the serial number under the condition that the number is equal to 1; and provide the fault processing solution that is to take a link problem into account, and suggest replacing the RAID card, a backplane and an SAS cable one by one in sequence under the condition that the number is greater than 1.

In the disclosure, when the current log file is diagnosed through the fault diagnosis method, to provide the fault processing solution, besides the above two manners, the following manner may also be used for implementation.

The diagnosis keywords corresponding to the object file in the fault diagnosis rule base are divided by ",", and the last keyword after division is extracted. The last keyword may be recorded as key_last, then a numerical value corresponding to key_last is extracted from the current log file, and the numerical value is recorded as val.

Under the condition that val is equal to 0, a content of a line where the numerical value is located is filtered out from the current log file, that is, fault information corresponding to val being equal to 0 is filtered out.

Under the condition that val is greater than 0, a serial number of "serialNumber=" may be extracted from the current log file. In an embodiment, the serial number is extracted from the content of the line where the numerical value is located and recorded as SN. Then, the current log file is circularly traversed according to ^\\s*Serialnumberlis*: \\s*"+SN+".*$ (the fourth preset regular expression). Under the condition that a line of content matching the fourth preset regular expression exists in the current log file, a content matching ^\\s*ReportedLocation.*: \\s*Enclosure.*Slot.*$ (that is, the fifth preset regular expression) is searched for forwards from the line of content, and a third slot number is extracted from the content matching the fifth preset regular expression, and recorded as slot3.

Under the condition that the diagnosis keyword corresponding to the object file in the fault diagnosis rule base includes any one of hwErrors (hardware error count), mediumErrors (media error count) and smartWarning (smart alarm count), the fault processing solution that is to replace the hard disk corresponding to the third slot number and the serial number is provided, that is, the fault processing solution that is to replace the hard disk on the third slot number and with a serial number being SN is provided.

Under the condition that the diagnosis keyword corresponding to the object file in the fault diagnosis rule base does not include any one of hw Errors, medium Errors, and smart Warning, the number of val greater than 0 and corresponding to the last keyword key_last is obtained. The number is recorded as N, and the number represents the number of faults of the hard disk.

Under the condition that N is equal to 1, the fault processing solution that is to replace the hard disk corresponding to the third slot number and the serial number is provided.

Under the condition that N is greater than 1, it is unlikely that a plurality of hard disks have faults simultaneously. The fault processing solution that is to take a link problem into account, and suggest replacing the RAID card, a backplane and an SAS cable one by one in sequence is provided.

The above fault diagnosis method may be regarded as PEDPHERD COMPONENT INTERCONNECT MEZZANINE CARD (PMC) fault diagnosis.

The fault diagnosis method provided in the example of disclosure may further include:

extract state information from the current log file under the condition that no object file matching the current log file of the RAID card exists in the fault diagnosis rule base, or under the condition that an object file matching the current log file of the RAID card exists in the fault diagnosis rule base and no at least one line of content matching each diagnosis keyword in the current log file;

construct a log training set according to the state information, selecting a sample from the log training set by means of a Relief filter selection algorithm, searching for a near-hit sample from samples of the same class as the sample, randomly selecting a near-miss sample from samples of different classes from the sample, increasing, under the condition that a distance between the sample and the near-hit sample in the feature is less than a distance between the sample and the near-miss sample in a same feature, a weight of the feature, reducing, under the condition that the distance between the sample and the near-hit sample in the feature is not less than the distance between the sample and the near-miss sample in the same feature, the weight of the feature, performing training on the feature preset times, and obtaining an average weight of the feature after the preset times of training;

add a feature with an average weight greater than a preset value into a feature set, and output the feature set; and receive an analysis result of the feature set, and add the analysis result of the feature set to the fault diagnosis rule base.

In the disclosure, it is considered that the log file including no fault information may include the fault information, such that the fault diagnosis rule base may be continuously updated by using the log file including no fault information, and then accuracy of fault diagnosis performed by the fault diagnosis rule base is improved.

In an embodiment, under the condition that no object file matching the current log file of the RAID card exists in the fault diagnosis rule base, or under the condition that an object file matching the current log file of the RAID card exists in the fault diagnosis rule base and no at least one line of content matching each diagnosis keyword in the current log file, these log files are such log files with no fault information (referred to as fault-free log files). In this case, state information may be extracted from the fault-free log files. The fault-free log file consists of two parts of a fixed part and a variable part, for example: 169:21-01-11,21:23:59Info:VD02/2isnowOPTIMAL. "Info:VD" is the fixed part, and the rest are the variable part. Information before the fixed part "Info:VD" is log ID, time, etc., which are not valuable for log fault diagnosis, and information after "Info: VD" represents state information, where the state information represents a health state of the RAID card or hard disk. Therefore, Event1:[0-9]{1,}:[0-9]{2}-[0-9]{2}-[0-9]{2}, *Info: VD.* may be defined during log fault diagnosis, to extract information conforming to Event1, and the extracted information is divided by "Info:VD", to obtain the state information, for example: "isnowOPTIMAL". A basic model event in this step can extract all model features of the RAID card, and the model features mentioned herein include a health feature and a fault feature. Then, these model features need to be screened, and the fault feature is extracted and used to perfect the fault diagnosis rule base. Feature selection is performed by a Relief filter selection algorithm.

Based on what is described above, the state information extracted from the fault-free log file is taken as a log training set and recorded as RD. A sample R is randomly selected from the log training set RD by using the Relief filter selection algorithm. A nearest neighbor sample NH is searched for from samples of the same class as R, and is called near-hit. A sample is randomly selected from samples of a different class from R, recorded as NM, and called near-miss. Then feature extraction training is performed according to the following training rules: under the condition that a distance between R and NH in a certain feature is less than a distance between R and NM in the same feature, it indicates that the feature is beneficial to distinguishing of nearest neighbors of the same class from the different classes, and therefore, a weight of the feature is increased; under the condition that the distance between R and NH in the above feature is not less than the distance between R and NM in the same feature, it indicates that the feature has a negative effect on distinguishing the nearest neighbors of the same class from the different classes, and therefore, the weight of the feature is reduced. The above training process is performed preset times (the preset times is recorded as m). Finally, an average weight of the feature after the preset times of training is obtained. The larger the average weight is, the stronger the classification capability is, and on the contrary, the weaker the classification capability is.

The feature with stronger classification capability is added to the feature set, that is, the feature with an average weight greater than a preset value is added to the feature set. The preset value may be set according to actual needs, and the average weight greater than the preset value indicates that the feature has stronger classification capability. A specific algorithm is as follows:

$$\delta = \left( \sum_{n-1}^{m} (-\mathit{diff}(R_n, NH_n) + \mathit{diff}(R_n, NM_n)) \right) / m$$

where $R_n$ represents a sample randomly selected for the nth time from the log training set RD, $NH_n$ is a near-hit sample selected for the nth time, $NM_n$ is a near-miss sample selected for the nth time, $\delta$ is the average weight of the feature finally obtained, and therefore, a value of n here is a discrete value. Formula diff (X,Y) is calculated as follows:

$$\mathit{diff}(X, Y) =$$

$$\begin{cases} 0 \\ 1 \end{cases}, \text{ where when } X = Y, \mathit{diff}(X, Y) = 0, \text{ and otherwise } \mathit{diff}(X, Y) = 1$$

After the feature with the average weight greater than the preset value is added to the feature set, the feature set may be output, such that relevant personnel may analyze the feature set manually to obtain an analysis result. The analysis result may include the same format as the rule information included in the fault diagnosis rule base. Correspondingly, the monitoring platform may receive the analysis result of the feature set, and add the analysis result of the feature set to the fault diagnosis rule base, so as to update and improve the fault diagnosis rule base, to perform fault diagnosis on the log file of the RAID card according to the updated fault diagnosis rule base, and to improve accuracy of fault diagnosis.

According to the fault diagnosis method provided in the example of the disclosure, the step of outputting a log file that determines that the RAID card and/or the hard disk managed by the RAID card has a fault, and the fault processing solution may include:

output the log file that determines that the RAID card and/or the hard disk managed by the RAID card has a fault, and the fault processing solution to a mobile terminal by means of an email and/or a short message.

In the disclosure, when a log file that determines that the RAID card and/or the hard disk managed by the RAID card has a fault, and the fault processing solution are output, in an embodiment, the log file that determines that the RAID card and/or the hard disk managed by the RAID card has a fault, and the fault processing solution are output to a mobile terminal by means of an email and/or a short message, such that relevant personnel can obtain relevant information in time and process the fault in time.

The example of the disclosure further provides a fault diagnosis device. FIG. 2 is a schematic structural diagram of a fault diagnosis device according to an example of the disclosure. The device may include:

an obtaining module 21, configured to obtain all log files of an RAID card in a server to be monitored;

a determination module 22, configured to determine whether the RAID card and a hard disk managed by the RAID card have a fault according to a fault diagnosis rule base and the log files of the RAID card, and provide a fault processing solution by using the fault diagnosis rule base when it is determined that the RAID card and/or the hard disk managed by the RAID card has a fault, where the fault diagnosis rule base is established by analyzing historical faults of the RAID card and the hard disk managed by the RAID card in advance; and an output module 23, configured to output a log file that determines that the RAID card and/or the hard disk managed by the RAID card has a fault, and the fault processing solution.

According to the fault diagnosis device provided in the example of the disclosure, the determination module 22 may include:

a comparison unit, configured to compare each log file of the RAID card with the fault diagnosis rule base, and determine whether an object file matching a current log file of the RAID card exists in the fault diagnosis rule base;

a matching unit, configured to match each diagnosis keyword corresponding to the object file with each line of content in the current log file under the condition that the object file exists;

a determination unit, configured to determine that the RAID card and/or the hard disk managed by the RAID card has a fault under the condition that at least one line of content matching each diagnosis keyword exists in the current log file; and a diagnosis unit, configured to determine whether a fault diagnosis method corresponding to the object file exists in the fault diagnosis rule base, and diagnose the current log file through the fault diagnosis method under the condition that the fault diagnosis method corresponding to the object file exists, to provide the fault processing solution.

According to the fault diagnosis device provided in the example of the disclosure, the diagnosis unit may include:

a first extraction sub-unit, configured to extract a first slot number from the current log file according to a first preset regular expression;

a search sub-unit, configured to search for latest information corresponding to the first slot number from the current log file;

a first providing sub-unit, configured to provide the fault processing solution that is to replace a hard disk on the first slot number under the condition that the latest information includes abnormal information;

a first filter sub-unit, configured to filter the latest information from the current log file under the condition that the latest information includes normal information; and a second providing sub-unit, configured to provide the fault processing solution that is to provide a hard disk fault on the first slot number, suggest submitting a work order and escalate a corresponding fault problem to tier two under the condition that the latest information does not include the abnormal information and the normal information.

According to the fault diagnosis device provided in the example of the disclosure, the diagnosis unit may include:

a second extraction sub-unit, configured to extract a second slot number from the current log file according to a second preset regular expression, and extract an error count corresponding to the second slot number from the current log file according to a third preset regular expression;

a third providing sub-unit, configured to provide the fault processing solution that is to replace the RAID card, a backplane and a serial-attached small computer system interface (SAS) cable one by one in sequence under the condition that the error count is greater than 1; and a fourth providing sub-unit, configured to provide the fault processing solution that is to replace a hard disk on the second slot number under the condition that the error count is equal to 1.

According to the fault diagnosis device provided in the example of the disclosure, the diagnosis unit may include:

a third extraction sub-unit, configured to extract a last keyword corresponding to the object file from the fault diagnosis rule base, and extract a numerical value corresponding to the last keyword from the current log file;

a second filter sub-unit, configured to filter a content of a line where the numerical value is located from the current log file under the condition that the numerical value is equal to 0;

a fourth extraction sub-unit, configured to extract a serial number from the current log file under the condition that the numerical value is great than 0, circularly traverse the current log file according to a fourth preset regular expression, search, under the condition that a line of content matching the fourth preset regular expression exists in the current log file, forwards from a line of content matching the fourth preset regular expression for a content matching a fifth preset regular expression, and extract a third slot number from the content matching the fifth preset regular expression;

a fifth providing sub-unit, configured to provide the fault processing solution that is to replace the hard disk corresponding to the third slot number and the serial number under the condition that the diagnosis keyword in the fault diagnosis rule base includes any one of hw Errors, medium Errors, and smart Warning;

an obtaining sub-unit, configured to obtain the number of numerical values greater than 0 and corresponding to the last keyword under the condition that the diagnosis keyword in the fault diagnosis rule base does not include any one of hw Errors, medium Errors, and smart Warning;

a sixth providing sub-unit, configured to provide the fault processing solution that is to replace the hard disk corresponding to the third slot number and the serial number under the condition that the number is equal to 1; and a seventh providing sub-unit, configured to provide the fault processing solution that is to take a link problem into account, and suggest replacing the RAID card, a backplane and an SAS cable one by one in sequence under the condition that the number is greater than 1.

The fault diagnosis device provided in the example of the disclosure may further include:

an extraction module, configured to extract state information from the current log file under the condition that no object file matching the current log file of the RAID card exists in the fault diagnosis rule base, or under the condition that an object file matching the current log file of the RAID card exists in the fault diagnosis rule base and no at least one line of content matching each diagnosis keyword in the current log file;

a training module, configured to constructing a log training set according to the state information, select a sample from the log training set by means of a Relief filter selection algorithm, search for a near-hit sample from samples of the same class as the sample, randomly select a near-miss sample from samples of different classes from the sample, increase, under the condition that a distance between the sample and the near-hit sample in a feature is less than a distance between the sample and the near-miss sample in the same feature, a weight of the feature, reduce, under the condition that the distance between the sample and the near-hit sample in the feature is not less than the distance between the sample and the near-miss sample in the same feature, the weight of the feature, perform training on the feature preset times, and obtain an average weight of the feature after the preset times of training;

a first adding module, configured to add a feature with an average weight greater than a preset value into a feature set, and output the feature set; and a second adding module, configured to receive an analysis result of the feature set, and add the analysis result of the feature set to the fault diagnosis rule base.

According to the fault diagnosis device provided in the example of the disclosure, the output module 23 may include:

an output unit, configured to output the log file that determines that the RAID card and/or the hard disk managed by the RAID card has a fault, and the fault processing solution to a mobile terminal by means of an email and/or a short message.

The example of the disclosure further provides a fault diagnosis apparatus. FIG. 3 is a schematic structural diagram of a fault diagnosis apparatus according to an example of the disclosure. The apparatus may include:

a memory 31, configured to store a computer program; and a processor 32, configured to execute the computer program in the memory 31, to implement the following steps:

obtain all log files of an RAID card in a server to be monitored; determine whether the RAID card and a hard disk managed by the RAID card have a fault according to a fault diagnosis rule base and the log files of the RAID card, and provide a fault processing solution by using the fault diagnosis rule base when it is determined that the RAID card and/or the hard disk managed by the RAID card has a fault, where the fault diagnosis rule base is established by analyzing historical faults of the RAID card and the hard disk managed by the RAID card in advance; and output a log file that determines that the RAID card and/or the hard disk managed by the RAID card has a fault, and the fault processing solution.

The example of the disclosure further provides a readable storage medium, FIG. 4 is a schematic structural diagram of a readable storage medium according to an example of the disclosure. The readable storage medium 601 stores a computer program 602. When executed by a processor, the computer program 602 may implement the following steps: obtain all log files of an RAID card in a server to be monitored; determine whether the RAID card and a hard disk managed by the RAID card have a fault according to a fault diagnosis rule base and the log files of the RAID card, and provide a fault processing solution by using the fault diagnosis rule base when it is determined that the RAID card and/or the hard disk managed by the RAID card has a fault, where the fault diagnosis rule base is established by analyzing historical faults of the RAID card and the hard disk managed by the RAID card in advance; and output a log file that determines that the RAID card and/or the hard disk managed by the RAID card has a fault, and the fault processing solution.

The readable storage medium 601 may include: a universal serial bus flash disk, a mobile hard disk drive, a read-only memory (ROM), a random access memory (RAM), a magnetic disk, an optical disk, or various media that may store a program code.

For description of relevant parts of the fault diagnosis device and apparatus, and a computer-readable storage medium provided in the disclosure, reference may be made to detailed description of corresponding parts of the fault diagnosis method provided in the examples of the disclosure, which is not repeated herein.

It should be noted that the relation terms, for example, first, second, etc., are used herein merely for distinguishing one entity or operation from another entity or operation but do not necessarily require or imply that there exists any actual relation or sequence between these entities or operations. The terms "comprise," "include" or their any other variations are intended to cover a non-exclusive inclusion, such that inherent elements of a process, method, article, or apparatus including a list of elements are included. In the case of no more limitations, the element limited by the sentence "including a . . . " does not exclude that there exists another same element in the process, method, article or apparatus including the element. In addition, parts of the technical solutions provided in the examples of the present application that are consistent with the corresponding technical solutions in the prior art in terms of the implementation principle are not described in detail, so as to avoid redundant description.

The above description of the provided embodiments to enable the person skilled in the art to implement or use the present application. Various modifications to these embodiments will be readily apparent to those skilled in the art, and generic principles defined herein may be implemented in other embodiments without departing from the spirit or scope of the disclosure. Thus, the disclosure is not to be limited to the embodiments shown herein but is to be accorded the widest scope consistent with the principles and novel features disclosed herein.

What is claimed is:

1. A fault diagnosis method, performed by a monitoring platform, comprising:
obtaining log files of a redundant array of independent disks (RAID) card in a server to be monitored;
comparing each log file of the RAID card with a fault diagnosis rule base, and determining whether an object file matching a current log file of the RAID card exists in the fault diagnosis rule base, wherein the fault diagnosis rule base is established by analyzing historical faults of the RAID card and the hard disk managed by the RAID card in advance; matching each diagnosis keyword corresponding to the object file with each line of content in the current log file under the condition that the object file exists; determining that the RAID card and/or the hard disk managed by the RAID card has a fault under the condition that at least one line of content matching each diagnosis keyword exists in the current log file; and
determining whether a fault diagnosis method corresponding to the object file exists in the fault diagnosis rule base, in a case that the fault diagnosis method corresponding to the object file exists, extracting a last keyword corresponding to the object file from the fault diagnosis rule base, and extracting a numerical value corresponding to the last keyword from the current log file;
filtering the content of a line where the numerical value is located from the current log file under the condition that the numerical value is equal to 0;
extracting a serial number from the current log file under the condition that the numerical value is great than 0, circularly traversing the current log file according to a fourth preset regular expression, searching, under the condition that a line of content matching the fourth preset regular expression exists in the current log file, forwards from the line of content matching the fourth preset regular expression for a content matching a fifth preset regular expression, and extracting a third slot number from the content matching the fifth preset regular expression;
providing the fault processing solution that is to replace the hard disk corresponding to the third slot number and the serial number under the condition that the diagnosis keyword in the fault diagnosis rule base comprises any one of hwErrors, mediumErrors, and smartWarning;
obtaining the number of numerical values greater than 0 and corresponding to the last keyword under the condition that the diagnosis keyword in the fault diagnosis rule base does not comprise any one of hwErrors, mediumErrors, and smartWarning;
providing the fault processing solution that is to replace the hard disk corresponding to the third slot number and the serial number under the condition that the number is equal to 1; and
providing the fault processing solution that is to take a link problem into account, and suggest replacing the RAID card, a backplane and an SAS cable one by one in sequence under the condition that the number is greater than 1.

2. The fault diagnosis method according to claim 1, further comprising:
extracting state information from the current log file under the condition that no object file matching the current log file of the RAID card exists in the fault diagnosis rule base, or under the condition that an object file matching the current log file of the RAID card exists in the fault diagnosis rule base and no at least one line of content matching each diagnosis keyword in the current log file;
constructing a log training set according to the state information, selecting a sample from the log training set by means of a Relief filter selection algorithm, searching for a near-hit sample from samples of the same class as the sample, randomly selecting a near-miss sample from samples of different classes from the sample, increasing, under the condition that a distance between the sample and the near-hit sample in a feature is less than a distance between the sample and the near-miss sample in the same feature, a weight of the feature, reducing, under the condition that the distance between the sample and the near-hit sample in the feature is not less than the distance between the sample and the near-miss sample in the same feature, the weight of the feature, performing training on the feature preset times, and obtaining an average weight of the feature after the preset times of training;

adding a feature with an average weight greater than a preset value into a feature set, and outputting the feature set; and receiving an analysis result of the feature set, and adding the analysis result of the feature set to the fault diagnosis rule base.

3. The fault diagnosis method according to claim 1, further comprising:

outputting the log file that determines that the RAID card and/or the hard disk managed by the RAID card has a fault, and the fault processing solution to a mobile terminal by means of an email and/or a short message.

4. A fault diagnosis apparatus, comprising:

a memory, configured to store a computer program; and a processor, configured to execute the computer program:

obtain log files of a redundant array of independent disks (RAID) card in a server to be monitored;

compare each log file of the RAID card with a fault diagnosis rule base, and determine whether an object file matching a current log file of the RAID card exists in the fault diagnosis rule base, wherein the fault diagnosis rule base is established by analyzing historical faults of the RAID card and the hard disk managed by the RAID card in advance; match each diagnosis keyword corresponding to the object file with each line of content in the current log file under the condition that the object file exists; determine that the RAID card and/or the hard disk managed by the RAID card has a fault under the condition that at least one line of content matching each diagnosis keyword exists in the current log file; and determine whether a fault diagnosis method corresponding to the object file exists in the fault diagnosis rule base, in a case that the fault diagnosis method corresponding to the object file exists, extract a last keyword corresponding to the object file from the fault diagnosis rule base, and extract a numerical value corresponding to the last keyword from the current log file;

filter the content of a line where the numerical value is located from the current log file under the condition that the numerical value is equal to 0;

extract a serial number from the current log file under the condition that the numerical value is great than 0, circularly traversing the current log file according to a fourth preset regular expression, search, under the condition that a line of content matching the fourth preset regular expression exists in the current log file, forwards from the line of content matching the fourth preset regular expression for a content matching a fifth preset regular expression, and extract a third slot number from the content matching the fifth preset regular expression;

provide the fault processing solution that is to replace the hard disk corresponding to the third slot number and the serial number under the condition that the diagnosis keyword in the fault diagnosis rule base comprises any one of hwErrors, mediumErrors, and smartWarning;

obtain the number of numerical values greater than 0 and corresponding to the last keyword under the condition that the diagnosis keyword in the fault diagnosis rule base does not comprise any one of hwErrors, mediumErrors, and smartWarning;

provide the fault processing solution that is to replace the hard disk corresponding to the third slot number and the serial number under the condition that the number is equal to 1; and provide the fault processing solution that is to take a link problem into account, and suggest replacing the RAID card, a backplane and an SAS cable one by one in sequence under the condition that the number is greater than 1.

5. A non-transitory readable storage medium, storing a computer program, wherein the computer program is configured to, when executed by a processor, cause the processor to:

obtain log files of a redundant array of independent disks (RAID) card in a server to be monitored;

compare each log file of the RAID card with a fault diagnosis rule base, and determine whether an object file matching a current log file of the RAID card exists in the fault diagnosis rule base, wherein the fault diagnosis rule base is established by analyzing historical faults of the RAID card and the hard disk managed by the RAID card in advance; match each diagnosis keyword corresponding to the object file with each line of content in the current log file under the condition that the object file exists;

determine that the RAID card and/or the hard disk managed by the RAID card has a fault under the condition that at least one line of content matching each diagnosis keyword exists in the current log file; and determine whether a fault diagnosis method corresponding to the object file exists in the fault diagnosis rule base, in a case that the fault diagnosis method corresponding to the object file exists, extract a last keyword corresponding to the object file from the fault diagnosis rule base, and extract a numerical value corresponding to the last keyword from the current log file;

filter the content of a line where the numerical value is located from the current log file under the condition that the numerical value is equal to 0;

extract a serial number from the current log file under the condition that the numerical value is great than 0, circularly traversing the current log file according to a fourth preset regular expression, search, under the condition that a line of content matching the fourth preset regular expression exists in the current log file, forwards from the line of content matching the fourth preset regular expression for a content matching a fifth preset regular expression, and extract a third slot number from the content matching the fifth preset regular expression;

provide the fault processing solution that is to replace the hard disk corresponding to the third slot number and the serial number under the condition that the diagnosis keyword in the fault diagnosis rule base comprises any one of hwErrors, mediumErrors, and smartWarning;

obtain the number of numerical values greater than 0 and corresponding to the last keyword under the condition that the diagnosis keyword in the fault diagnosis rule base does not comprise any one of hwErrors, mediumErrors, and smartWarning:

provide the fault processing solution that is to replace the hard disk corresponding to the third slot number and the serial number under the condition that the number is equal to 1; and provide the fault processing solution that is to take a link problem into account, and suggest replacing the RAID card, a backplane and an SAS cable one by one in sequence under the condition that the number is greater than 1.

6. The fault diagnosis apparatus according to claim 4, wherein the processor is further configured to execute the computer program to:

extract state information from the current log file under the condition that no object file matching the current log file of the RAID card exists in the fault diagnosis rule base, or under the condition that an object file matching the current log file of the RAID card exists in the fault diagnosis rule base and no at least one line of content matching each diagnosis keyword in the current log file;

construct a log training set according to the state information, select a sample from the log training set by means of a Relief filter selection algorithm, search for a near-hit sample from samples of the same class as the sample, randomly selecting a near-miss sample from samples of different classes from the sample, increase, under the condition that a distance between the sample and the near-hit sample in a feature is less than a distance between the sample and the near-miss sample in the same feature, a weight of the feature, reduce, under the condition that the distance between the sample and the near-hit sample in the feature is not less than the distance between the sample and the near-miss sample in the same feature, the weight of the feature, perform training on the feature preset times, and obtain an average weight of the feature after the preset times of training;

add a feature with an average weight greater than a preset value into a feature set, and output the feature set; and receive an analysis result of the feature set, and add the analysis result of the feature set to the fault diagnosis rule base.

7. The fault diagnosis method according to claim 1, wherein the log files comprise at least one of the following:

hard disk state information file, logical disk list information file, controller configuration information file, controller device log information.

8. The fault diagnosis method according to claim 1, the method further comprises:

registering the information about the server to be monitored to the monitoring platform.

9. The fault diagnosis method according to claim 1, wherein the fault diagnosis rule base comprises pieces of rule information, where each piece of rule information has the following format:

file name;

diagnosis keyword;

fault diagnosis method.

10. The fault diagnosis method according to claim 1, the method further comprises:

using the log file including no fault information to update the fault diagnosis rule base continuously.

* * * * *